United States Patent
Kaspar

(10) Patent No.: US 6,170,957 B1
(45) Date of Patent: Jan. 9, 2001

(54) MOTOR-ADJUSTABLE VEHICLE REAR-VIEW MIRROR

(75) Inventor: Rudolf Kaspar, Collenberg (DE)

(73) Assignee: Donnelly Hohe GmbH & Co., KG (DE)

( * ) Notice: Under 35 U.S.C. 154(b), the term of this patent shall be extended for 0 days.

(21) Appl. No.: 09/111,253

(22) Filed: Jul. 3, 1998

(30) Foreign Application Priority Data

Jul. 3, 1997 (DE) .......................................... 297 11 539 U

(51) Int. Cl.$^7$ .................................................. G02B 7/182
(52) U.S. Cl. ........................ 359/877; 359/872; 359/873; 359/874; 359/841; 248/476
(58) Field of Search ..................... 359/877, 872, 359/873, 874, 841; 248/476, 477

(56) References Cited

U.S. PATENT DOCUMENTS

| | | | |
|---|---|---|---|
| 4,678,295 | 7/1987 | Fisher | 359/874 |
| 4,701,037 | 10/1987 | Bramer | 359/874 |
| 4,915,493 | 4/1990 | Fisher et al. | 359/874 |
| 5,042,932 | 8/1991 | Pent | 359/874 |
| 5,166,825 | 11/1992 | Fujie et al. | 359/509 |
| 5,233,319 | * 8/1993 | Mizan et al. | 333/219 |
| 5,343,333 | 8/1994 | Nagayama et al. | 359/874 |
| 5,430,624 | 7/1995 | Yoshida et al. | 362/74 |
| 5,781,356 | * 7/1998 | Okada et al. | 359/841 |

FOREIGN PATENT DOCUMENTS

| | | | |
|---|---|---|---|
| 37 40 485 A1 | 6/1989 | (DE) | B60R/1/06 |
| 40 11 934 A1 | 10/1990 | (DE) | B60R/1/06 |
| 40 09 444 A1 | 11/1990 | (DE) | B60R/1/06 |
| 40 22 019 A1 | 1/1991 | (DE) | B60R/1/06 |
| 37 90 327 C2 | 6/1993 | (DE) | H05B/3/26 |
| 43 40 850 A1 | 6/1994 | (DE) | B60R/1/06 |
| 39 14 334 C2 | 8/1994 | (DE) | B60R/1/06 |
| 37 27 288 C2 | 10/1994 | (DE) | B60R/1/08 |
| 43 12 847 A1 | 10/1994 | (DE) | B60R/1/06 |
| 44 11 384 A1 | 10/1995 | (DE) | B60R/1/06 |
| 195 20 320 C1 | 5/1996 | (DE) | B60R/1/06 |
| 196 01 565 A1 | 8/1996 | (DE) | B60R/1/06 |
| 195 09 153 A1 | 9/1996 | (DE) | H03B/3/10 |
| 195 21 432 A1 | 12/1996 | (DE) | B90R/1/06 |
| 196 01 565 C2 | 5/1997 | (DE) | B60R/1/06 |

OTHER PUBLICATIONS

Patents Abstract of Japan, M–293, Apr. 28, 1984, Vo. 8/No.; Control Device of Car Side Mirror, App. No. 57–116952 Intl. Class B60R 1/06, G02B 5/08.
Patents Abstract of Japan, M–343 Dec. 7, 1984, Vo. 8/No. 267; Mirror Driving Device of Fender Mirror, Etc., App. No. 58–12619, Intl. Class B60R 1/06, G02B 5/08, G02B 7/18.
European Search Report, EP 98 11 1514, 2 pp.; Oct. 2, 1998.
German Search Report, based on priority 297 11 539.1, Oct. 27, 1997, 3 pp.

* cited by examiner

Primary Examiner—Mohammad Y. Sikder

(57) ABSTRACT

A motor-adjustable rear-view mirror has a housing, a mirror glass assembly, at least one mirror adjustment drive that effects alignment of the mirror adjustment drive to the reinforcement plate, in which the fastening device has at least one section for transmission of electrical energy and/or electrical signals to the mirror adjustment drive.

13 Claims, 3 Drawing Sheets

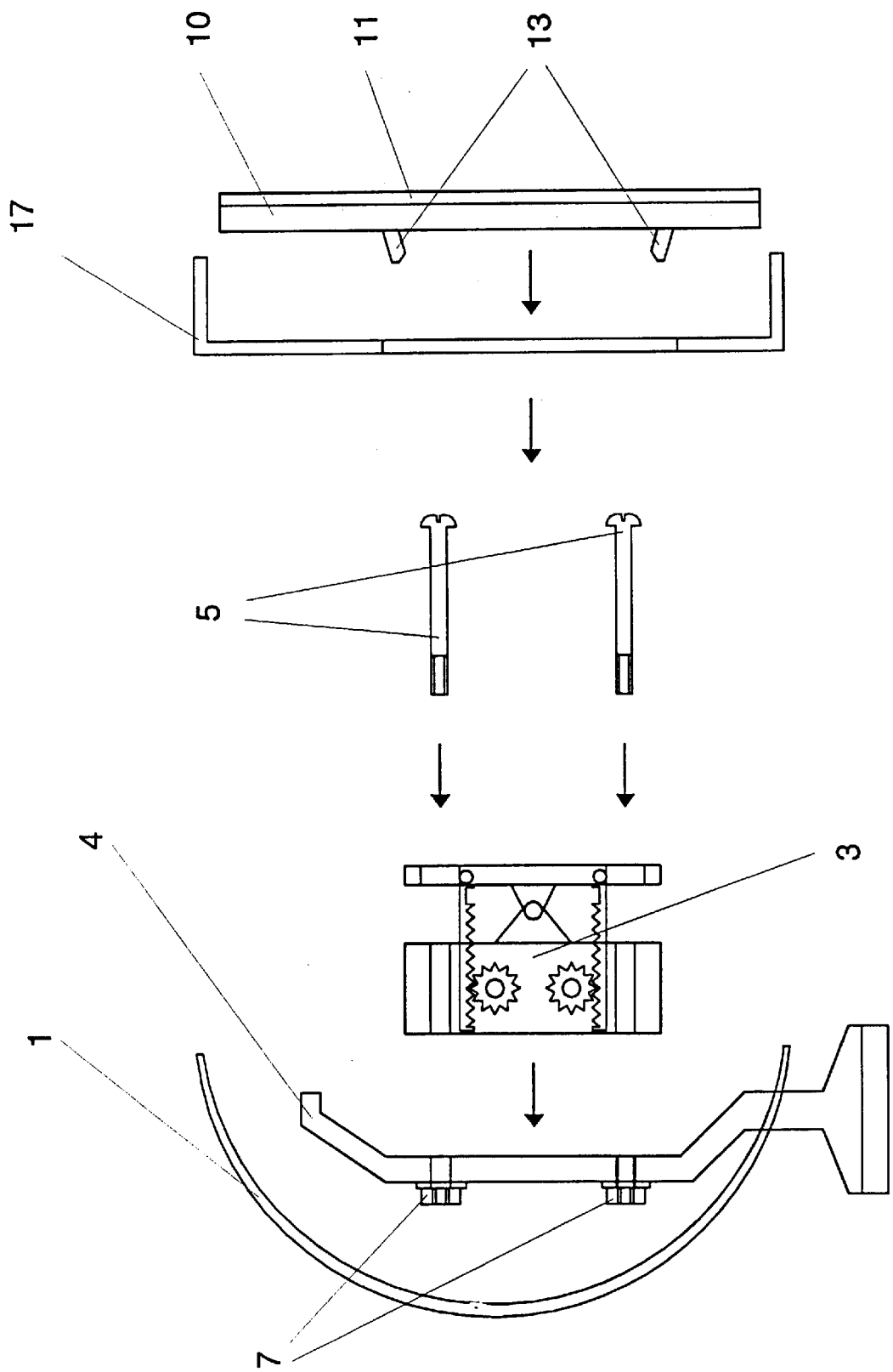

MOTOR-ADJUSTABLE VEHICLE REAR-VIEW MIRROR

BACKGROUND OF THE INVENTION

1. Field of the Invention

The invention relates to a motor-adjustable vehicle rear-view mirror, and more particularly to an arrangement that includes a housing that contains at least one mirror glass assembly, a mirror adjustment drive and a reinforcing plate, wherein the mirror adjustment drive acting on the alignment of the mirror glass assembly is mounted to the reinforcing plate by means of a fastening device.

2. Discussion of Relevant Prior Art

Vehicle rear-view mirrors that are motor-adjustable are well known in this field. The mirror adjustment drive is electrically connected to a power supply by very varied designs.

For example, connecting leads can be soldered to the respective connecting terminals of the mirror adjustment drive. The other ends of the connecting leads are brought out of the mirror housing and are connected to the power supply by means of a connector. The necessary soldering process increases the number of time consuming work steps during the assembly of the mirror. Furthermore, when mounting of the mirror, there is a great danger that the electrical leads will be crushed during the fastening of the mirror adjustment drive to the reinforcing plate.

In another embodiment according to the state of the art, the contacts are made by means of plug connectors that are arranged on the drive. Such plug connectors at this exposed place have to be made moisture-tight, which considerably increases their volume and makes mounting additionally difficult. Furthermore, the danger still exists that cables will be crushed, and in the worst case even parted, during mounting.

SUMMARY OF THE INVENTION

The object of the invention is to provide a secure and simple structure for the electrical connection of electrical components within a vehicle rear-view mirror.

This is effected surprisingly simply by a motor-adjustable rear view mirror having the following features:

a housing, a mirror glass assembly, at least one mirror adjustment drive that effects alignment of the mirror glass assembly, a reinforcing plate, and a fastening device that fastens the mirror adjustment drive to the reinforcement plate, in which the fastening device has at least one section for transmission of electrical energy and/or electrical signals to the mirror adjustment drive.

According to the present invention, the electrical energy and/or electrical signals to the mirror adjustment drive are conducted by means of at least a section of the fastening device that is made conductive. The conventionally necessary additional connection between the mirror adjustment drive and the wire harness is dispensed with. Crushing cables between the mirror adjustment drive and the reinforcing plate is avoided. Because an additional electrical connection is dispensed with, the work cost and the space requirement in the mirror housing during mounting are decreased.

To securely seat the mirror adjustment drive on the reinforcing plate, the fastening device can include at least three connecting elements. If these connecting elements are themselves arranged to be electrically conductive and electrically insulated from each other, the three electrical connections that are usual at the present time can be completely effected by means of the fastening device. For electrical contacting, the connecting elements can be electrically connected in the vicinity of (i.e. at or the neighborhood of) a first end with the respective connecting leads of the motor, for example in the form of contact strips, and in the vicinity of a second end with the wiring harness that supplies power and/or data signals.

In order to insure a compact construction, the at least sectionally conductive connecting elements extend in passage openings in the mirror adjustment drive.

Many conventional connecting devices can be used as the connecting elements, and if necessary can be modified as regards their electrical conductivity. For example, the connecting element can include in a simple structure a screw with a nut that holds the mirror adjustment drive and the reinforcing plate in abutment between the screw head and the nut. To insure easy mounting, the connecting element can also consist of two parts, with interengaging sections of the two parts forming a rotary snap-on closure, and with at least the mirror adjustment drive and the reinforcing plate held in abutment between the two ends of the connecting element.

The usual diecast parts, or else plastic parts, can be used as the reinforcing plate. Plastic reinforcing plates have the advantage, in contrast to diecast reinforcing plates, that no electrical insulation of the feedthroughs of the mirror adjustment drive, for example, in the form of sleeves introduced into the feedthroughs, is necessary.

The invention can also be applied to the newer vehicle rear-view mirrors that use intelligent electronics in the mirror glass housing, with analog and/or digital control.

The printed circuit board that receives the electronics can be directly or indirectly seated on the reinforcing plate, and the connecting elements can be connected with contact places on the printed circuit board. The contact places can be electrically connected to the wiring harness that provides the current supply and/or the digital data signals. In this manner, a digitally controllable mirror adjustment drive, which requires two digital signal leads (digital signal/ground) and two leads for the voltage supply (analog plus/ground) can be connected according to the invention by means of four conductive connecting elements. Furthermore, by combining the digital and analog ground, there is the possibility of working with only three connecting elements, which according to the invention simultaneously serve as electrical connections.

In order to produce a contact of the at least sectionally electrically conductive screw to the printed circuit board, an electrically conductive nut, for example a rivet nut, can be arranged in the printed circuit board, and the screw is screwed or turned onto it, while the electrically conductive rivet nut is connected on the printed circuit board to the corresponding lead of the wiring harness.

The provision of a printed circuit board seated on the reinforcing plate furthermore offers the possibility of contacting the heating leads of the mirror glass through the mirror adjustment drive in a similar manner to the connecting elements. In this case also, the mounting of an additional cable pair is dispensed with, and the risk of crushing an electrical connection during assembly is avoided.

For this purpose, two spring contact pins project through the mirror adjustment drive from the printed circuit board, and press on associated contacts of the heating system on the back side of the mirror glass carrier.

To protect the electrical contacts or the electronics against moisture, and in particular against corrosion-promoting salt water, the printed circuit board can be protected in the vehicle exterior mirror. The usual processes for sealing electronic components, as regards the dimensions of the sheathing structure, the setting time, and the setting temperature, do not satisfy the requirements to be placed on components in a vehicle outer mirror. Various processes for the sealing of electronic assemblies are known in the state of the art, such as molding and casting. However, this does not hold for the specific application to the exterior mirror region of motor vehicles. According to the invention, an effective protection, particularly also against vibration, can be provided by molding around the printed circuit board, for example with an elastic material, applied by an injection molding process and sheathing and sealing the printed circuit board. A melt adhesive can be used as the material, for example. The advantage of such a material also consists in that it is easy to process, requires only a short setting time and low setting temperature, and can be applied in a sufficient thickness. An effective and permanent sealing of the electronic components is thereby also insured.

BRIEF DESCRIPTION OF THE DRAWINGS

The invention is described hereinbelow in preferred embodiments, with reference to the accompanying drawings, in which:

FIG. 1 shows, in an exploded diagram, the individual component elements of a vehicle rear-view mirror of a first embodiment according to the invention, by way of example;

DETAILED DESCRIPTION OF PREFERRED EMBODIMENTS

Figure 4:
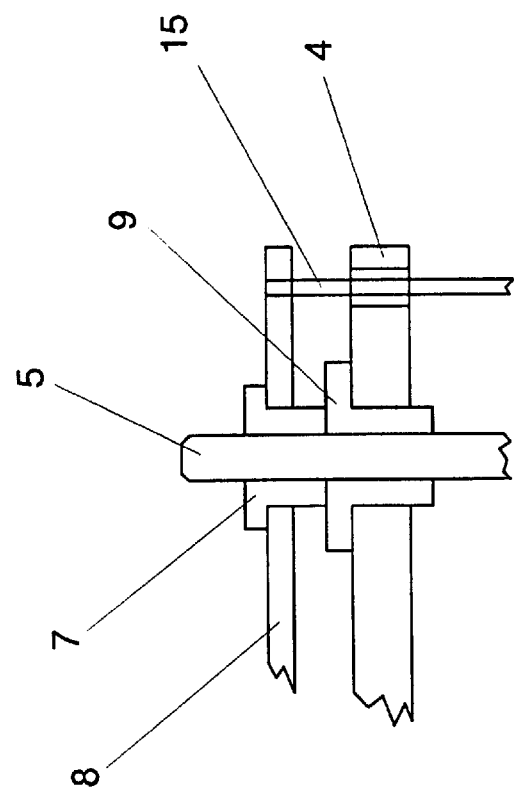
FIG. 4 shows in detail, the screw connection of the second embodiment, with a rivet nut arranged in the printed circuit board.

FIG. 1 shows a first embodiment of the invention in an exploded diagram. According to this embodiment, the motor-adjustable vehicle rear-view mirror according to the invention includes a housing 1 that receives a mirror glass assembly, a mirror adjustment drive 3 that acts on the alignment of the mirror glass assembly, and a reinforcing plate 4 to which the mirror adjustment drive 3 is attached by means of a fastening device. The mirror glass assembly includes a mirror glass carrier 10 with a mirror glass 11 fitted onto it and a casing 17. The fastening device at least sectionally conducts electrical energy to the mirror adjustment drive. In the embodiment shown, the fastening device includes three elements, of which only two are shown in the diagram, for the sake of clarity. These fastening elements in the form of screws 5 are inserted through corresponding openings in the mirror adjustment drive. The mirror adjustment drive 3 and the reinforcing plate 4 are brought into mutual abutment, and the screws 5 are turned through openings in the reinforcing plate 4 into nuts 7 placed behind the openings. The screws and the nuts are made of a conductive metal, copper in the present example. The reinforcement plate 4 is produced from an impact-resistant, non-conductive plastic and thus insures the electrical insulation of the three nuts 7. In another arrangement the reinforcing plate 4 includes a diecast aluminum part, insulators being interposed between the diecast aluminum part and the screws, and between the diecast part and the nuts 7 positioned against it, in order to prevent short circuits.

Figure 2:
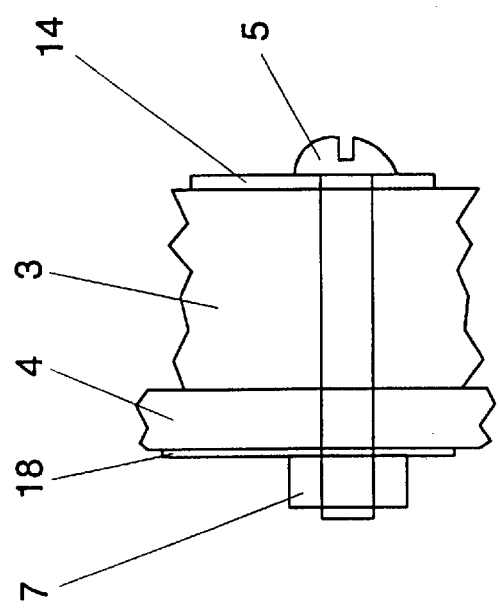
FIG. 2 shows in detail, the connection of the mirror adjustment drive to the plastic reinforcing plate, and the respective electrical contacts for the first embodiment.

The electrical contact of the mirror adjustment drive 3 to the side of the screw head, and the electrical contact to a power supply on the side of the nuts 7 behind the reinforcing plate, is shown in FIG. 2 for the screw connection of the first embodiment. This screw connection holds the mirror adjustment drive 3 in abutment on the reinforcing plate 4 and passes through the mirror adjustment drive 3. A contact strip 14 is brought into direct abutment with the electrically conductive screw 5, to produce the associated electrical contact to the drive. In this embodiment according to the invention, the screw 5 passes through the flat contact strip 14 and, with the screw head, presses the contact strip 14 against the mirror adjustment drive, so that electrical contact is produced at the same time between the contact strip 14 and the screw 5. The respective contact strip furthermore leads to the corresponding drive connection, which is not shown.

On the other side of the connection, a thin metal plate 18 is arranged between the electrically conductive nut 7 and the reinforcing plate 4, and produces an electrical contact to the corresponding lead of the wiring harness. In a further arrangement of the invention, the sections of the reinforcing plate with which the nuts are in contact are coated with a conductive material, and the associated leads of the wiring harness are electrically connected to the respective sections.

After the mounting of the mirror adjustment drive 3 on the reinforcing plate 4, and the production of the necessary connections, the mirror glass assembly is clipped onto the mirror adjustment drive 3. For this purpose, the glass carrier plate 10 to which the mirror glass 11 is adhered includes clip elements in the form of fingers 13 that are brought into engagement with the edge of the mirror adjustment drive 3, an optical casing 17 being furthermore arranged between the mirror adjustment drive 3 and the glass carrier plate 10.

In another arrangement of the invention, instead of a screw and a nut, the connecting element used is two connecting parts with interengaging sections, which together form a bayonet closure.

Figure 3:
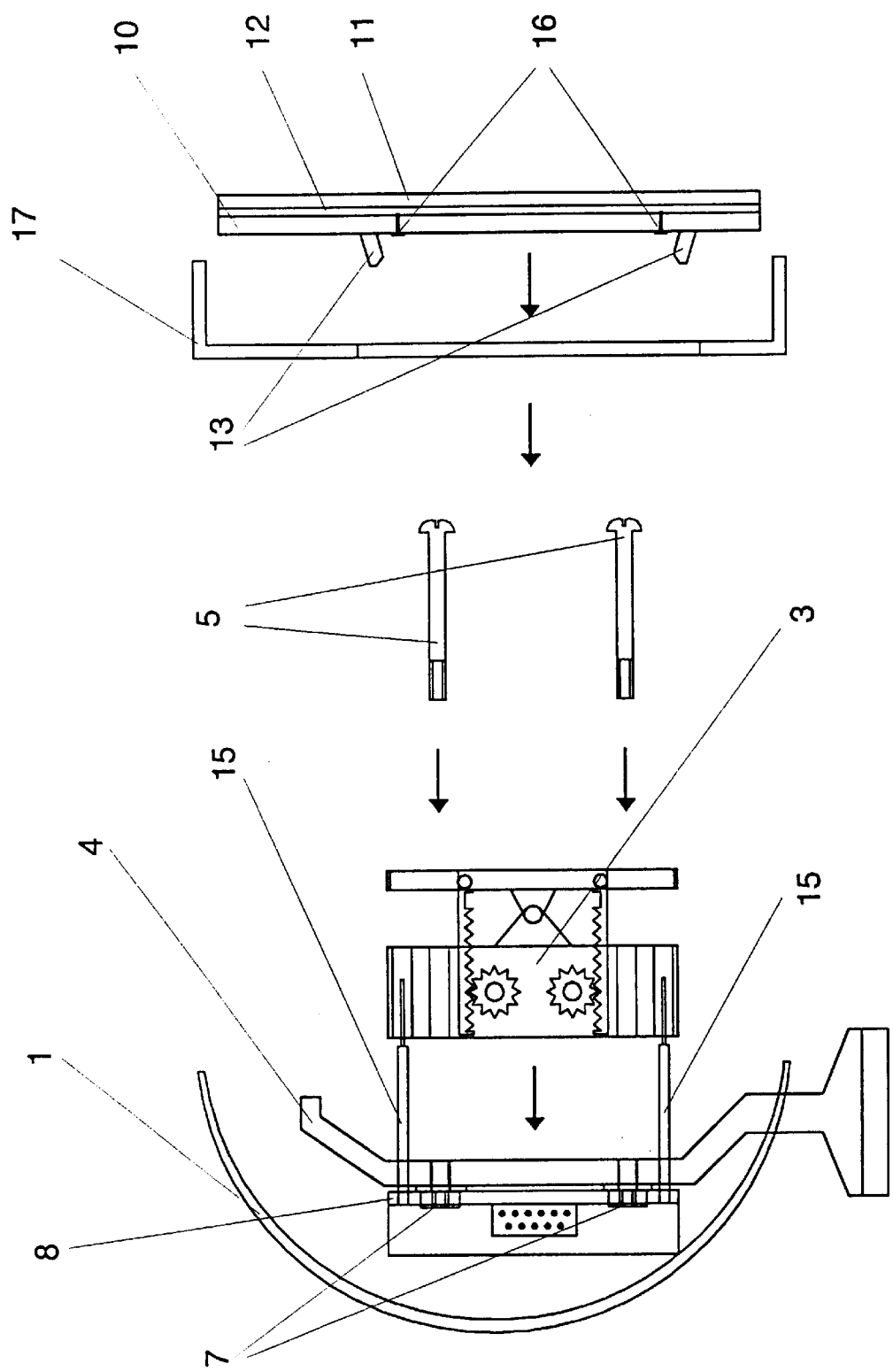
FIG. 3 shows, in an outline of principles in an exploded diagram, the individual component elements of a vehicle rear-view mirror of a second embodiment according to the invention, by way of example.

FIG. 3 shows a second embodiment of the invention, in an exploded view; here, in contrast to the first-described embodiment, a printed circuit board 8 is arranged on the back side of the reinforcing plate 4. The electrical contact to the wiring harness is made by fitting on the printed circuit board 8 a socket into which the plug of the wiring harness can be inserted. According to this embodiment of the invention, the leads are electrically connected to the printed circuit board 8 either directly with the fastening nuts 7, or after first passing through electrical switching circuits on the printed circuit board. In the latter case, two leads insure the power supply of the vehicle rear-view mirror, while the third lead is used as the digital signal lead for controlling and adjusting the mirror adjustment drive 3, the digital ground of the control lead being combined with the analog ground.

In a further arrangement of the invention, the digital ground is provided to the mirror adjustment drive 3 separately from the analog ground. In this case, instead of three connecting elements in the form of electrically conductive fastening screws 5, four screws pass through the mirror adjustment drive 3 and simultaneously serve to fasten the mirror adjustment drive 3 to the reinforcing plate 4 and to place the four connections of the mirror adjustment drive 3 in contact with the associated connections on the printed circuit board 8.

FIG. 4 shows in a detail the electrical contact of a fastening screw 5 to the printed circuit board 8 via a nut 7.

To produce the electrical contact, and to fasten the drive 3, the screw 5 is screwed into a nut 7, which is riveted into the printed circuit board 8. In order to insulate the screw from the metallic reinforcing plate 4, an insulating sleeve 9 through which the screw 5 extends is arranged in the through-opening of the metallic reinforcing plate 4.

The embodiment of the invention shown in FIG. 3 has a mirror glass heating system 12. This is adhered to the back side of the mirror glass 11 between the mirror glass and the mirror glass carrier 10. Heating contacts 16 are passed through the glass carrier 10 to its back side.

The electrical connection to the mirror heating 12 is provided by two contact pins 15, which extend from the printed circuit board 8, to the associated contacts 16 on the glass carrier plate 10. These contact pins 15 are designed to be resilient, and after mounting press on the associated contacts 16.

According to this embodiment of the invention, a permanently elastic material, for example, a melt adhesive, is injected around the whole printed circuit board or partial regions of it. For this, the printed circuit board is placed in an aluminum mold and the melt adhesive is injected into the mold by means of compressed air at a pressure of up to 4 bar and a temperature of about 120° C.

I claim:

1. A motor-adjustable vehicle rear-view mirror, comprising:
    a housing,
    a mirror glass assembly,
    at least one mirror adjustment drive (3) that effects alignment of said mirror glass assembly,
    a reinforcing plate (4), and
    a fastening device that fastens said mirror adjustment drive to said reinforcing plate, in which,
        said fastening device has at least one section for transmission of at least one of electrical energy and electrical signals to said mirror adjustment drive, wherein said fastening device extends through said reinforcing plate and through an opening in said mirror adjustment drive (3) into a nut (7) placed behind said opening.

2. The motor-adjustable vehicle rear-view mirror according to claim 1, in which said fastening device includes at least three connecting elements that, at least in a section, hold said mirror adjustment drive (3) in at least one of a direct and indirect seating on said reinforcing plate (4).

3. The motor-adjustable vehicle rear-view mirror according to claim 2, in which at least one of said connecting elements is electrically conductive at least in one section.

4. The motor-adjustable vehicle rear-view mirror according to claim 2, in which said at least three connecting elements are arranged so as not to be in direct electrical contact with each other.

5. The motor-adjustable vehicle rear-view mirror according to claim 2, in which said mirror adjustment drive includes a motor, and at least one of said connecting elements in the vicinity of one end thereof is electrically connected with a connecting lead of said motor and in the vicinity of a second end thereof is electrically connected to a wiring harness that supplies power and/or data signals to said mirror adjustment drive.

6. The motor-adjustable vehicle rear-view mirror according to claim 2, in which at least one of said connecting elements is a screw (5) that is screwed into said nut (7), and at least said mirror adjustment drive (3) and said reinforcing plate (4) are arranged between a head of said screw and said screw nut (7).

7. The motor-adjustable vehicle rear-view mirror according to claim 2, in which at least one of said connecting elements comprises two parts that interengage to form a rotary snap closure, and at least said mirror adjustment drive (3) and said reinforcing plate (4) are arranged between two ends of said connecting element when said rotary snap closure is closed.

8. The motor-adjustable vehicle rear-view mirror according to claim 2, further comprising a printed circuit board (8) arranged in direct or indirect abutment with said reinforcing plate (4) and having contact places electrically connected to respective ends of said connecting elements and electrically connected to a wiring harness that supplies power and/or data signals to said mirror adjustment drive.

9. The motor-adjustable vehicle rear-view mirror according to claim 8, in which a nut (7) is arranged on said printed circuit board (8) and at least one of said connecting elements is screwed into said nut (7).

10. The motor-adjustable vehicle rear-view mirror according to claim 8, further comprising a mirror glass heating system (12) with first contacts (16) and second contacts (15) that are arranged on said printed circuit board (8) and are associated with said mirror glass heating system (12) and extend through at least one opening in said mirror adjustment drive (3) as far as said first contacts (16) of said mirror glass heating system (12).

11. The motor-adjustable vehicle rear-view mirror according to claim 8, in which said mirror glass assembly (2) includes a mirror glass carrier (10), a mirror glass (11) arranged on said mirror glass carrier (10), said mirror glass heating system (12) being applied to a back side of said mirror glass (11), and electrical contacts (16) on said mirror glass heating system that pass to a back side of said mirror glass carrier (10); and said printed circuit board (8) includes at least two resilient contact pins (15) electrically connected to respective heating leads of a wiring harness; said contact pins (15) extending through said mirror adjustment drive (3) substantially parallel to said connecting elements and pressing on said associated electrical contacts (16) on said back side of the mirror glass carrier (10).

12. The motor-adjustable vehicle rear-view mirror according to claim 8, further comprising a material injected around at least said printed circuit board (8).

13. The motor-adjustable vehicle rear-view mirror according to claim 12, in which said material comprises a permanently elastic melt adhesive.

* * * * *